May 28, 1935. W. G. LERCH ET AL 2,002,579
TIRE RETREAD VULCANIZER
Filed March 22, 1933

INVENTORS
William G. Lerch and
BY Arthur W. Stoner
Fay, Oberlin & Fay
ATTORNEYS

Patented May 28, 1935

2,002,579

UNITED STATES PATENT OFFICE 2,002,579

TIRE RETREAD VULCANIZER

William G. Lerch, Akron, and Arthur W. Stoner, Findlay, Ohio; said Lerch assignor of one-half of his entire right, and said Stoner assignor of his entire right to Master Tire and Rubber Corporation, Akron, Ohio, a corporation of Delaware Application March 22, 1933, Serial No. 662,060

3 Claims. (Cl. 18—18)

This invention relates to the art of retreading pneumatic tires and aims to provide a method and an apparatus in which the method is simple and quick, requiring a minimum of handling of the tires and very little adjustment of the apparatus. The invention aims to provide apparatus which is simple, effective, has a small number of separate elements, which is durable, and which is quickly and easily operated. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

Figure 1:
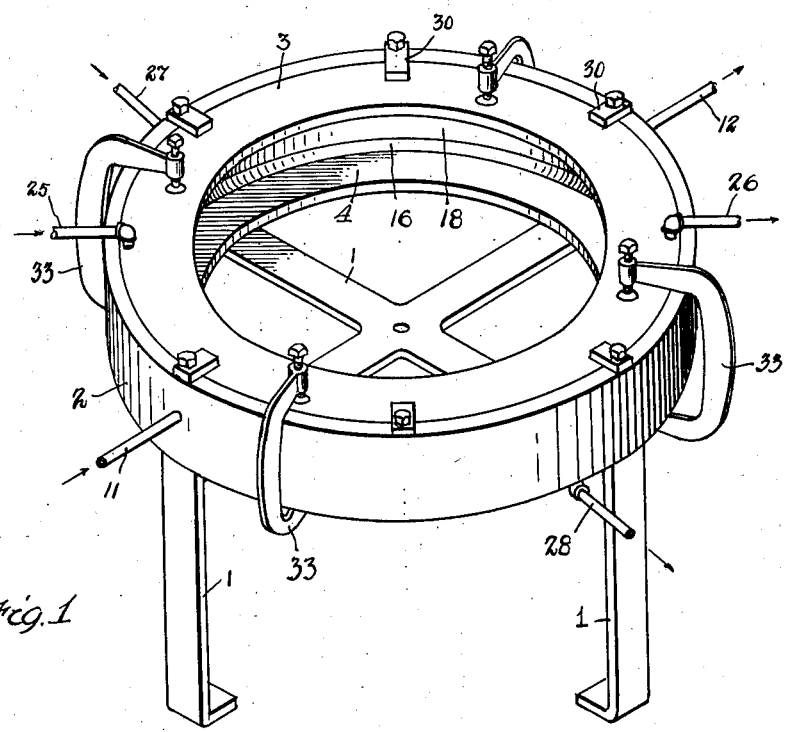
Figure 2:
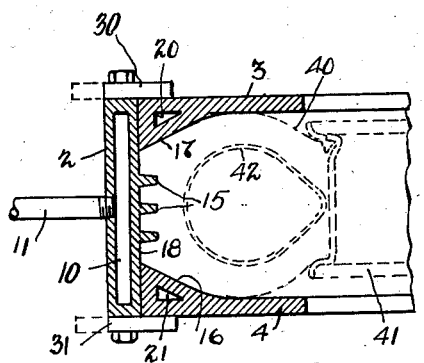

In said annexed drawing, Fig. 1 is a perspective view of our improved apparatus looking from the front and above, the apparatus being assembled except that no tire is in place; and Fig. 2 is a vertical cross section through one side, showing a tire in place.

The apparatus, which is suitably supported on a stand 1 at convenient working height, comprises a vertical ring 2 and horizontal rings 3 and 4 of such a size as to make an easy sliding fit within the outer ring 2, as will be seen by reference to Fig. 2. The outer ring 2, for which cast iron is a suitable material, is hollowed as at 19 around its circumference, thus providing a steam cavity. Steam is admitted on one side as by the pipe 11 and discharged on the other side as by the pipe 12. Thus the entire space 19 is kept filled with steam at desired temperature and pressure for heating the ring. On the inner edge of the ring a suitable tread pattern is formed, diagrammatically represented in Fig. 2 by the three ribs 15.

The top and bottom plates 3 and 4 are inwardly beveled as at 16 and 17. The outer edges of these plates make a fairly close sliding fit with the inner surface 18 of the ring 2, all as shown in Fig. 2. The ring 3 includes a steam cavity around its diameter within the bevel. This cavity is indicated at 20. A similar cavity 21 is included within the bevel 16 of the ring 4. Steam is applied to the cavity 20 by an inlet pipe 25 and discharged by an outlet pipe 26. An inlet pipe 27 and outlet pipe 28 likewise communicate with the cavity 21. A series of lugs such as 30 on the top and 31 on the bottom, are bolted or otherwise suitably secured to the ring 2. These may be turned inward to the position of Fig. 1, also shown in solid lines in Fig. 2, or turned out, as shown in Fig. 2, after loosening the bolts, to allow the removal of the rings 3 and 4 respectively. C clamps such as 33 are used at intervals to force the rings 3 and 4 towards one another against a tire being treaded. In Fig. 2, a tire 40 is shown in place upon a rim 41 of any standard construction. The usual inner tube 42 is in place and filled with air under proper pressure to keep the tire expanded. In Fig. 2 the usual rim surfacing strip is assumed to have been applied and, since this is well understood in the art, is not shown separately. The tire shown in Fig. 2 is assumed to be of a size which would be properly compressed by the lugs 30 and 31. For a thinner tire the clamps 33 would be used. The bevels 16 and 17 form the side surfaces of the tread during the vulcanizing process. These beveled faces may also be provided with a pattern if desired, although none is shown in the drawing.

In operation, a vulcanizer is made ready to receive a tire by removing the upper ring 3. The tire and retread strip being put in, the ring 3 is replaced, the tire is inflated, and the rings 3 and 4 adjusted to proper size by means of the clamps. Since each can slide in telescope fashion within its respective part of the ring 2, it will be seen that the press can take a considerable range of tire sizes, although all must be of the same diameter. After the rings 3 and 4 are placed, the vulcanizing is carried out by passing steam through the cavities 10, 20 and 21, as will be readily understood by those skilled in the art. To remove the tire, the ring 3 is removed, the tire deflated, the rim 41 taken out, whereupon the tire can then be taken out of the vulcanizer.

It will be seen from the foregoing that we have invented a tire vulcanizer which combines great strength and rigidity, with some flexibility as to sizes which can be treaded, and one which can be set up for use very quickly and from which the finished retreaded tire can be removed readily.

What we claim is:

1. A tire vulcanizer comprising a circumferential curing mold having a heating cavity therein, annular side plates fitting slidably within said mold and also having internal heating cavities, sloping shoulders on said side plates adapted to form the shoulders of a tire, the radially inner parts of said side plates being spaced from a tire in operation and means for holding said side plates in said circumferential curing mold around a tire being vulcanized.

2. A tire vulcanizer comprising a circumferential curing mold, annular side plates fitting said mold, beveled shoulders on said side plates converging toward the inner face of said curing mold, flat portions on said side plates within said shoulders adapted to support the side walls of the tire inwardly of said shoulders, said side portions being adapted to clear a service rim supporting said tire, and means for causing said side plates to approach each other in said curing mold.

3. A tire vulcanizer comprising a circumferential curing mold, side plates fitting said mold, beveled shoulders on said side plates adjacent the inner face of said curing mold, flat surfaces on said side plates inward of said shoulders and approximately tangent to the middle side wall of said tire but clearing said tire and a tire-supporting rim inward of said middle side wall, heating means associated with said vulcanizer, means for telescoping said side plates in said curing mold, a service tire rim and service inner tube for supporting and inflating a tire in said mold, and means for securing said side plates in said mold.

WILLIAM G. LERCH.
ARTHUR W. STONER.